United States Patent
Verma (10) Patent No.: US 10,353,348 B2
(45) Date of Patent: Jul. 16, 2019

(54) SYSTEM, INDUSTRIAL CONTROLLER AND METHOD CONFIGURED TO EXECUTE A CLOSED LOOP CONTROL ON DATA FOR CLOUD BASED APPLICATIONS

(71) Applicant: Siemens Aktiengesellschaft, München (DE)

(72) Inventor: Amit Verma, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 45 days.

(21) Appl. No.: 15/604,284

(22) Filed: May 24, 2017

(65) Prior Publication Data

US 2017/0343967 A1  Nov. 30, 2017

(30) Foreign Application Priority Data

May 25, 2016 (EP) ..................................... 16171365

(51) Int. Cl.
*G05B 13/00* (2006.01)
*G05B 19/00* (2006.01)
(Continued)

(52) U.S. Cl.
CPC ......... *G05B 13/021* (2013.01); *G05B 19/056* (2013.01); *G05B 19/0426* (2013.01);
(Continued)

(58) Field of Classification Search
CPC ................ G05B 13/021; G05B 19/056; G05B 2219/31457; G05B 2219/31241; G05B 19/0426
See application file for complete search history.

(56) References Cited

U.S. PATENT DOCUMENTS 9,971,317 B2 * 5/2018 Maturana ............... G06F 9/5072
2009/0319060 A1 * 12/2009 Wojsznis ............... G05B 11/42
700/30
(Continued)

FOREIGN PATENT DOCUMENTS

CN 103631680 A 3/2014
CN 103685442 A 3/2014
(Continued)

OTHER PUBLICATIONS

Cloud Adaptation with Control Theory in Industrial Clouds; Wiggleworth; 8 pages; 2016 IEEE; printed form the Internet on Oct. 10, 2018.*

*Primary Examiner* — Ronald D Hartman, Jr.
(74) *Attorney, Agent, or Firm* — Henry M. Feiereisen LLC (57) ABSTRACT

A system executing a closed loop control on data for cloud-based applications includes an industrial automation device configured to generate cloud variables, a cloud-based application on a network device with cloud-computing infrastructure, an industrial controller controlling the industrial automation device by a user-defined program which receives the cloud variables, a cloud agent communicating with the user-defined control program and the cloud-based application. The cloud agent collects the cloud variables and sends them to the cloud-based application. The cloud-based application determines updated optimized cloud variables and notifies the cloud agent with the updated optimized cloud variables. The cloud agent reloads the updated optimized cloud variables and notifies the user-defined control program with the updated optimized cloud variables. The user-defined control program includes cloud constructs which request the updated optimized cloud variables during run-
(Continued)

time and reload the updated optimized cloud variables in the user-defined control program.

13 Claims, 4 Drawing Sheets

(51) Int. Cl.
*G05B 13/02* (2006.01)
*G05B 19/05* (2006.01)
*G05B 19/042* (2006.01)

(52) U.S. Cl.
CPC .............. *G05B 2219/31241* (2013.01); *G05B 2219/31457* (2013.01)

(56) References Cited

U.S. PATENT DOCUMENTS

| | | | |
|---|---|---|---|
| 2013/0166621 A1 | 6/2013 | Zhu | |
| 2013/0212214 A1* | 8/2013 | Lawson | G06Q 10/06315 709/217 |
| 2014/0047064 A1 | 2/2014 | Maturana et al. | |
| 2014/0058537 A1* | 2/2014 | Jost | G05B 19/0426 700/16 |
| 2014/0129688 A1 | 5/2014 | Asenjo et al. | |
| 2014/0337429 A1* | 11/2014 | Asenjo | H04L 65/403 709/204 |
| 2015/0277404 A1* | 10/2015 | Maturana | G06F 9/5072 700/83 |
| 2015/0277406 A1 | 10/2015 | Maturana et al. | |
| 2016/0182309 A1* | 6/2016 | Maturana | G06F 17/5009 709/224 |
| 2016/0274552 A1* | 9/2016 | Strohmenger | G05B 11/01 |
| 2016/0364649 A1* | 12/2016 | Ding | G05B 13/04 |
| 2017/0139702 A1* | 5/2017 | You | G06Q 10/103 |
| 2017/0315541 A1* | 11/2017 | Kreidler | G05B 19/4185 |
| 2018/0052451 A1* | 2/2018 | Billi-Duran | G05B 19/41855 |
| 2018/0063244 A1 | 3/2018 | Maturana et al. | |
| 2018/0107230 A1* | 4/2018 | Sai | G05D 7/06 |

FOREIGN PATENT DOCUMENTS

| | | | | |
|---|---|---|---|---|
| CN | 103957228 A | 7/2014 | | |
| CN | 104950741 A | 9/2015 | | |
| CN | 104950836 A | 9/2015 | | |
| EP | 2544059 A1 | 1/2013 | | |
| EP | 2924570 A2 | 9/2015 | | |
| EP | 2924572 A2 * | 9/2015 | ............. | G05B 13/00 |
| EP | 2924572 A2 | 9/2015 | | |
| EP | 3070548 A2 | 9/2016 | | |

\* cited by examiner

```
Function Block Timed Counter:
Incremental count of the timed interval

FUNCTION_BLOCK FB_Timed Counter

VAR INPUT

Execute;                        // Trigger signal to begin Timed Counting
Time_Increment : REAL :=1.25.00;// Enter Cycle Time between counts
Count_Cycles;           // Nr Desired Count Cycles

END VAR
```

FIG 5

```
Function Block Timed Counter:
Incremental count of the timed interval

FUNCTION_BLOCK FB_Timed Counter

VAR_INPUT

Execute;                    // Trigger signal to begin Timed Counting
Count_Cycles;               // Number of Desired Count Cycles

END_VAR

VAR CLOUD

Time_Increment : REAL :=2.00;// Enter Cycle Time between counts

END VAR CLOUD
```

US 10,353,348 B2

SYSTEM, INDUSTRIAL CONTROLLER AND METHOD CONFIGURED TO EXECUTE A CLOSED LOOP CONTROL ON DATA FOR CLOUD BASED APPLICATIONS

CROSS-REFERENCES TO RELATED APPLICATIONS

This application claims the priority of European Patent Application Serial No. EP 16171365.6, filed May 25, 2016, the subject matter of which is incorporated herein by reference.

BACKGROUND OF THE INVENTION

The present invention relates to an approach of updating configurable parameters of a user-defined control program during runtime.

The following discussion of related art is provided to assist the reader in understanding the advantages of the invention, and is not to be construed as an admission that this related art is prior art to this invention.

Industrial automation is used to control machines and processes in manufacturing. An industrial automation installation comprises multiple computerized devices that control industrial processes and devices. The industrial devices generate a large number of variables to be monitored by the industrial automation. The devices of an industrial automation installation must work together in a coordinated way and performing operations. The local control algorithm may also perform local data analytics (on-board analytics).

Industrial controllers and their associated devices are central to the operation of modern industrial automation systems. These controllers interact with field devices on the field floor to control the automated processes relating to such objectives as product manufacture etc. Industrial automation installations can include one or more industrial controllers that monitor and control their processes. The controllers exchange data with field devices using native hardwired I/O or via a plant network such as Ethernet/IP, ControlNet or the like. Industrial controllers receive typically any combination of digital or analog signals from the field devices indicating current states of the devices and their associate processes. Industrial controllers are, for example, programmable logic controllers, (hereinafter referred to as PLC), or programmable controllers.

Industrial controllers store and execute user-defined control programs to effect decision-making in connection with the controlled process based on the received signals by changing the original parameters of the user-defined control program. PLC programs are typically written in a special application on a personal computer, then downloaded by a direct connection cable or over a network to the PLC. Such user-defined control programs can be, according to the IEC 61131-3 (IEC 61131 is an IEC standard for programmable controllers), but are not limited to, a ladder diagram (LD), sequential function charts (SFC), function block programming codes (FBD), structured text (ST), or other such programming structures.

Figure 1:
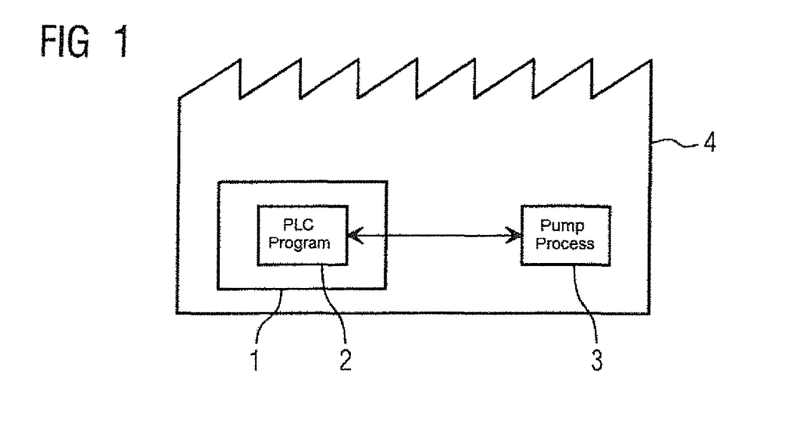
FIG. 1 shows a common cloud data model known in the art.

FIG. 1 shows the relationship between an industrial controller and its associated device and the user-defined control program in an industrial automation installation 4. Here, the industrial controller is an engineering station 1 which is used to program a function block as a PLC program 2 (state of the art), which is further deployed for controlling the operation of, for example, a pump process 3. Here, the local control algorithm of the function block performs, for example, local data analytics.

Nowadays, variables from field devices and automation systems are collected and brought (arrow 5) to a network device with a cloud computing infrastructure (hereinafter referred to as cloud 6, FIG. 2). A cloud computing infrastructure can be any infrastructure that allows shared computing services to be accessed and utilized by cloud-capable devices. The cloud computing infrastructure includes one or more communications networks. In some cases, a cloud computing infrastructure can be provided by a cloud provider as a platform-as-a-service (PaaS), and the services can reside and execute in the cloud computing infrastructure as a cloud-based service. Cloud services can generally include, but are not limited to, data storage, data analysis, control applications (e.g., applications that can generate and deliver control instructions to industrial devices based on analysis of near real-time system data or other factors), visualization applications such as cloud-based human-machine interfaces (HMIs), reporting applications, or other such cloud-based applications.

Figure 2:
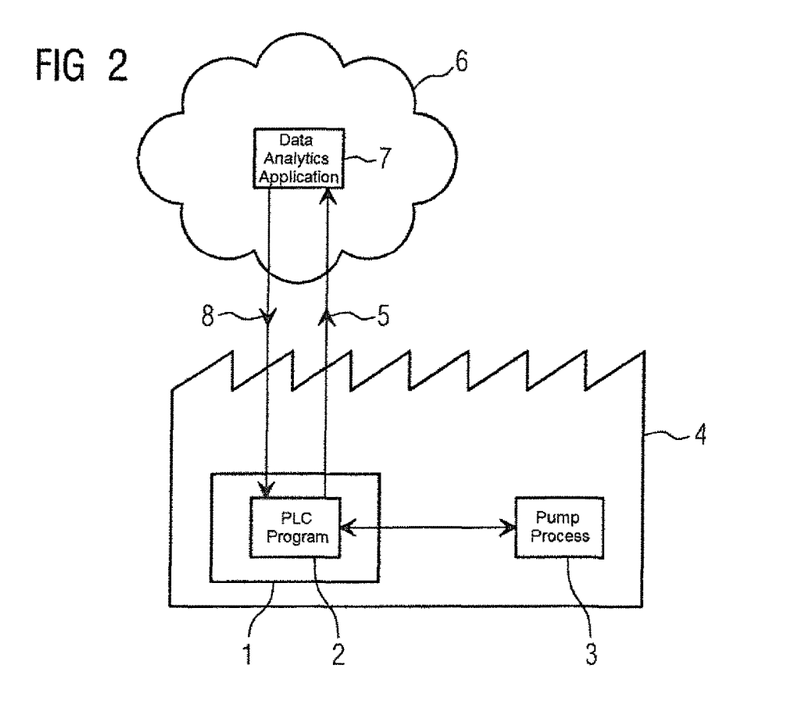
FIG. 2 shows a schematic overview of a conventional automation installation.

In the cloud 6 of FIG. 2, the data are analyzed with the help of (big) data analytics applications 7 (cloud-based) to identify process improvement potentials and provide insights, for example, optimized parameter(s). The analytics could be automated (e.g., with the help of artificial intelligence and machine learning methods) or semi-automated/manual (where a data scientist or a domain expert analyses the data). The optimized parameters obtained from data analytics have to be implemented (arrow 8) by changing the local control algorithm of the field devices or the automation system.

The control parameters are mainly the process parameters (e.g., certain process set-points, threshold values, parameters of a PID controller, etc.).

Typically, an automation expert takes the results of cloud based analytics, accesses the programming system of the PLC (e.g., STEP7 or TIA portal), modifies the FBs, builds the project and deploys again on the PLC. As this process is manual in nature, it limits the frequency of updating the local control parameters or the control logic. Cloud-based analytics may provide new control parameters several times a day. Due to its manual nature, this is also cost-intensive and error-prone.

It would therefore be desirable and advantageous to provide an improved system and method for updated optimized cloud variables in an automation system based on data analytics in a cloud to obviate prior art shortcomings.

SUMMARY OF THE INVENTION

According to one aspect of the present invention, a system for executing a closed loop control on data for cloud-based applications includes an industrial automation device configured to generate cloud variables, a cloud-based application which is hosted by a network device with a cloud-computing infrastructure, an industrial controller configured to control the industrial automation device by a user-defined control program, hosted by the industrial controller, said user-defined control program being configured to receive the cloud variables; a cloud agent configured to communicate with the user-defined control program and to communicate with the cloud-based application, said cloud agent configured to collect the cloud variables and to send the cloud variables to the cloud-based application, the cloud-based application being configured to determine updated optimized values of the cloud variables and to notify the cloud agent in the industrial controller with the updated optimized values of the cloud variables, the cloud agent being configured to reload the updated optimized values of the cloud variables and to notify the user-defined control program with the updated optimized values of the cloud variables, and the user-defined control program being configured to include cloud constructs which request the updated optimized values of the cloud variables during runtime and to reload the updated optimized values of the cloud variables in the user-defined control program.

According to another aspect of the present invention, a method for executing a closed loop control on data for a cloud-based application includes generating cloud variables by an industrial automation device, hosting a cloud-based application by a network device with a cloud-computing infrastructure, controlling the industrial automation device by a user-defined control program which is hosted by an industrial controller, receiving the cloud variables by the user-defined program, collecting the cloud variables and sending the cloud variables to the cloud-based application with a cloud agent configured for communication with the user-defined control program and for communication with the cloud-based application, determining by the cloud-based application updated optimized values of the cloud variables and notifying the cloud agent in the industrial controller with the updated optimized values of the cloud variables, reloading the updated optimized values of the cloud variables by the cloud agent, notifying the user-defined control program with the updated optimized values of the cloud variables by the cloud agent, and providing cloud constructs by the user-defined control program which requests the updated optimized values of the cloud variables during runtime and reloading the updated optimized values of the cloud variables in the user-defined control program.

According to still another aspect of the present invention, an industrial controller configured to execute a data transfer includes a user-defined control program hosted by the industrial controller, the user-defined control program being configured to control an industrial automation device and to receive cloud variables generated by the industrial automation device, a cloud agent configured to communicate with the user-defined control program and to communicate with a cloud-based application, said cloud agent configured to collect the cloud variables, to send the cloud variables to the cloud-based application, to notify the user-defined control program with updated optimized values of the cloud variables generated by the cloud-based application based on the received cloud variables, and to reload the updated optimized values of the cloud variables by the cloud agent, the cloud-based application being configured to determine the updated optimized values of the cloud variables and to notify the cloud agent in the industrial controller with the updated optimized values of the cloud variables, and the user-defined control program being configured to include cloud constructs which request the updated optimized values of the cloud variables during runtime and to reload the updated optimized values of the cloud variables in the user-defined control program.

Cloud variables are variables which are provided for updating in the cloud.

In accordance with the present invention, an automated method and system is therefore created of changing the variables in industrial automation systems based on results from cloud based analytics. In the manual update case, in the state of the art, there is always a delay from when an optimization is identified by a cloud based analytics application to when the controller is updated. The method described here eliminates this time delay, resulting in a better process optimization. The method also eliminates the need of manual intervention (and thus costs and errors) when updating the user-defined control program, for example, the control logic of a process.

The present invention is enabled by the definition of cloud constructs within the user-defined control program and cloud variables which can be dynamically updated on the industrial controller at runtime (for example, at the beginning of a scan cycle) based on a cloud based application in the network device with a cloud-computing infrastructure. The network device with a cloud-computing infrastructure is referred to afterwards as a cloud. A cloud definition is given in the description of FIG. 2.

The approach of defining the cloud variables directly into the programming language of the controller enables the user-defined control program, which interacts with the cloud, to be written in a simple manner.

Cloud based data analytics techniques have resulted in better process control and optimization, for example, better quality, reduced energy, etc. These results can only be leveraged effectively when there is an automated and efficient way of changing the process control logic in the field systems based on results from cloud based analytics. This problem is now solved by the invention. This effectively helps businesses to provide cloud based data analytics capabilities for automation systems in the field.

The present invention can analyze the cloud variables of an industrial device in the cloud. The optimized cloud variables can dynamically update the variables, for example, by modifying cloud variables on the controller controlling the loop.

Advantageously, the cloud agent can be hosted in the industrial controller. The advantages in this case are that the cloud agent is a part of the PLC software and is executed adjacent to the user-defined control program. This leads to better performance as network communications or inter process communications are avoided.

According to another advantageous feature of the present invention, the industrial controller can be configured as a PLC (programmable logic controller). The user-defined control program can be configured as a PLC program in a special language. Therefore, IEC 61131 deals with programming languages and defines two graphical and two textual PLC programming language standards: Ladder diagram (LD, graphical), Function block diagram (FBD, graphical), Structured text (ST, textual), Instruction list (IL, textual), Sequential function chart (SFC, having elements to organize programs for sequential and parallel control processing) and Continuous Function Chart (CFC). IEC 61131-3 is the third part of the open international standard IEC 61131 for programmable logic controllers.

According to another advantageous feature of the present invention, the cloud agent can include a unique ID (identity number) for identifying the user-defined control program, for which the cloud variables are collected and on which the cloud variables are to be updated.

According to another advantageous feature of the present invention, the cloud agent can be configured to aggregate continuously the cloud variables from the user-defined control program and send them to the cloud-based application. Furthermore, the cloud agent may also be configured to collect the variables, if any.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 3:
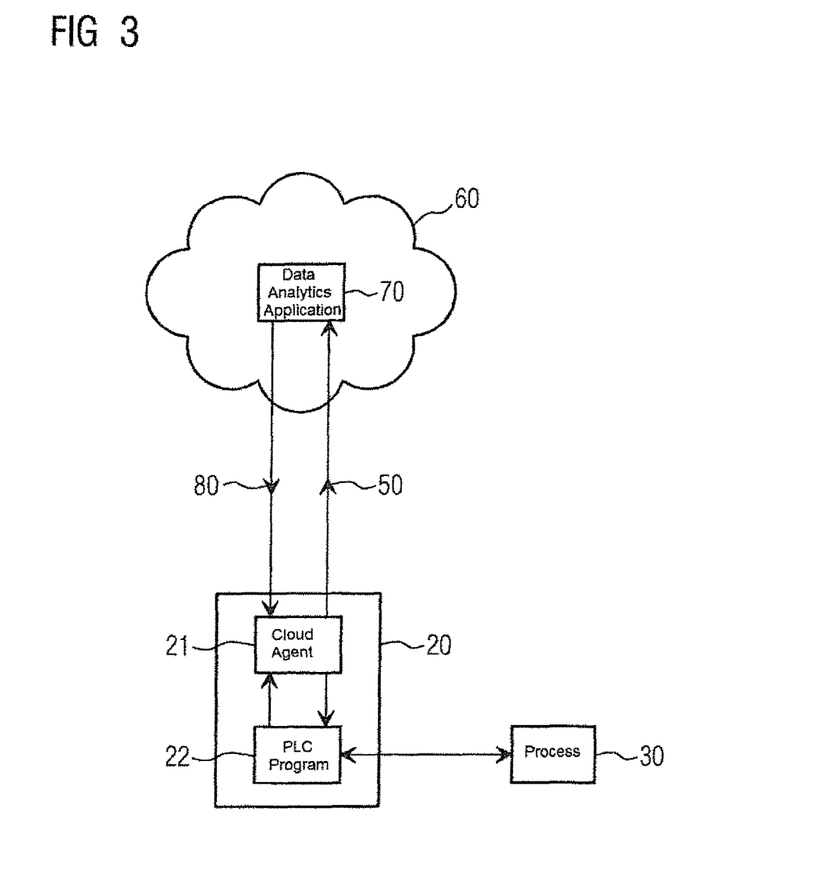
FIG. 3 shows a schematic overview of an industrial automation installation according to the present invention.

Turning now to the drawing, and in particular to FIG. 3, there is shown an example of an industrial automation installation according to the present invention. The industrial controller is a PLC 20, which stores and executes a user-defined control program, here a PLC program 22. The PLC 20 typically runs, therefore, a real time operating system (not shown) which hosts the PLC program 22 or any other applications (not shown) and services running on the PLC 20. The user-defined control program 22 is the program controlling the industrial process/activity 30 on a device. The control program includes a number of control variables which define the process parameters, for example, temperature set-points, flow rates, etc. (variables). The variables which have to be updated in the control program based on data analytics in the cloud (cloud variables) are defined in the programming language of the PLC in special (newly proposed) cloud constructs. The compiler for such programs is designed to understand the new cloud constructs. For the cloud constructs, the compiler will make provisions so as to update the values of the cloud variables in the PLC dynamically during runtime. This can be, for example, defined at the beginning of a scan cycle of a PLC 20. A scan cycle consists of three steps: input scanning, executing program(s), and output scanning. PLCs operate by continually scanning programs and repeating this process many times per second. When a PLC 20 starts, it runs checks on the hardware and software for faults, also called a self-test. If there are no problems, then the PLC will start the scan cycle.

Thus, the PLC program 22 is compiled, linked and built using the special compiler that understands the cloud constructs. That means that control program is built using a special compiler and a build tool that is designed to interpret the cloud constructs; then the PLC program 22 is deployed on the PLC 20 and executed. On execution, the PLC program 22 initializes the cloud variables with their default values.

The PLC program 22 has a sub-component that continuously listens, for example, to another program and/or process for any changes to the cloud variables. When the values of the cloud variables need to be changed, the PLC program 22 receives the new values, and updates the values of the cloud variables for use in the next scan cycle.

The user-defined control program is therefore typically an operating system process. The PLC program 22 controlling an industrial process is written in a programming language by an automation expert using an engineering tool.

In operation mode, the non-cloud variables and cloud variables are received and/or generated by the PLC program 22, A cloud agent 21, which is in communication with the PLC program 22, is configured to collect the cloud variables and to send the values of the cloud variables to the cloud-based application. That means that the cloud agent 21 on the PLC 20 collects at least the values of the cloud variables and sends them to the cloud 60 for analysis (arrow 50). The cloud agent 21 is, for example, another program and/or process running on the PLC 20. It continuously aggregates the values of the cloud variables from the PLC 20 and sends them to the cloud 60. The data analytics cloud-based application 70 in the cloud 60 analyzes the cloud variables and determines the optimal values of the cloud variables for the industrial process, which means generating updated optimized values of the cloud variables. That means that the cloud-based application 70 in the cloud 60 analyzes the data coming from a device in the field. Based on the data analysis, the data analytics cloud-based application 70 may determine that the values of the cloud variables of the industrial process in the PLC program 22 have to be changed.

The data analytics cloud-based application 70 notifies the cloud agent 21 (arrow 80) on the PLC 20 with the updated optimized values of the cloud variables of the industrial process.

The cloud agent 21 receives new values of the cloud variables from the data analytical applications 70 in the cloud 60 and notifies the PLC program 22 accordingly.

The cloud agent 21 has a unique ID (identity number) which is used to identify the PLC/PLC program 22 for which the values of the cloud variables are collected and on which the values of the cloud variables are to be updated.

The cloud agent 21 notifies the PLC program 22 with the updated optimized configuration of variables, and the constructs of the PLC program 22 request the updated optimized values of the cloud variables during runtime, for example, at the beginning of a new scan cycle and a reloading of the updated optimized values of the cloud variables.

Now the process 30 is controlled using the updated optimized values of the cloud variables as received from the cloud 60.

Figure 4:
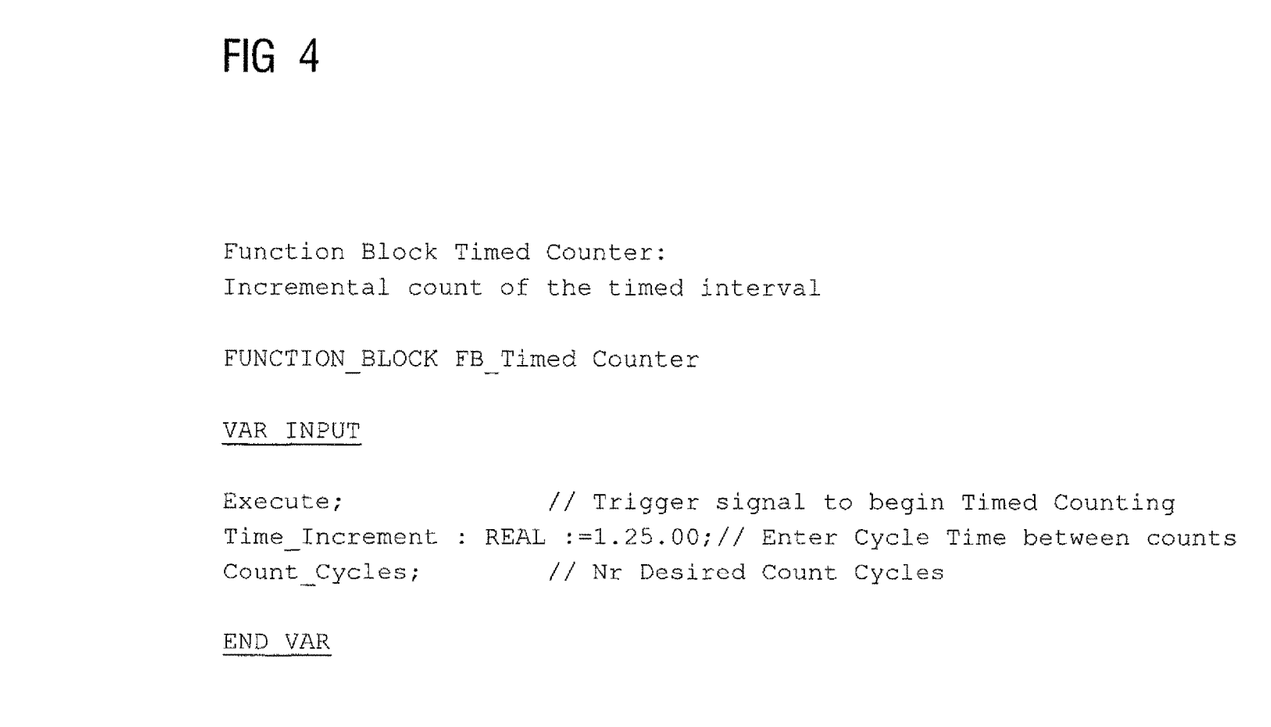
FIG. 4 shows an example program code known in the art.

FIG. 4 shows an example PLC program 22 according to the state of the art and written in: structured text. Structured text is one of the five languages supported by the IEC 61131-3 standard, designed for programmable logic controllers (PLCs).

This example relates to a Function Block (Timed Counter) that implements a timed counter by an incremental count of the timed interval. The variable "Time_Increment" has a default value of "1.25".

Figure 5:
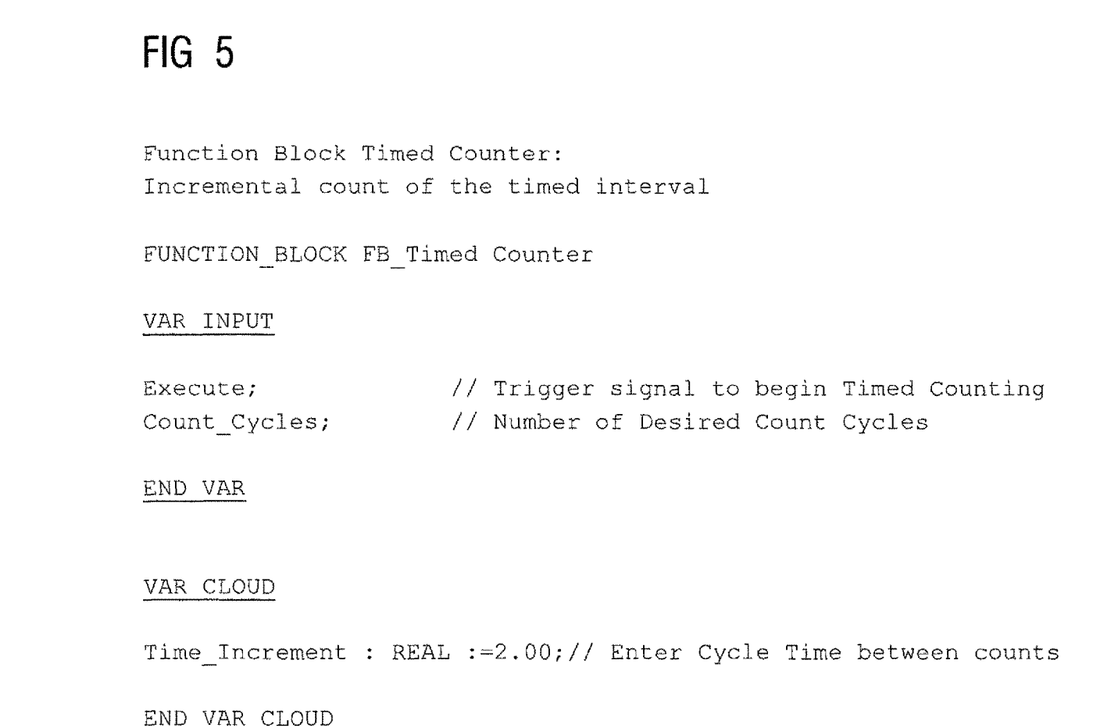
FIG. 5 shows an example program code according to the present invention.

FIG. 5 shows an example PLC program 22 of FIG. 4 modified according to the present invention. In this example, the cloud variables "Timeincrement" should be updateable from the cloud. To achieve this, a cloud construct, for example, VAR_CLOUD"Time_Increment", is written in structured text to declare such a cloud variable. In this case, when the code is compiled, the compiler knows that the cloud variable "Time_Increment" is updateable from the cloud and that it has a default value of "2.00". The compiler for such programs is designed to understand the new cloud constructs. For the cloud constructs, the compiler will make provisions so as to update the values of the cloud variables dynamically during runtime, for example, at the beginning of a scan cycle of a PLC program 22.

This invention describes a method of updating a set of cloud variables of a control program dynamically during runtime based on data analytics in the cloud 70. The idea is to define those data and/or parameters in a PLC program 22, which would be dynamically updated from the cloud 70 during the programming step. These are then the updated optimized cloud variables. The compilers for the PLC program 22 are developed accordingly so as to understand the cloud related programming constructs.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A system for executing a closed loop control on data for cloud-based applications, said system comprising:
    an industrial automation device that generates cloud variables;
    a cloud-based application which is hosted by a network device with a cloud-computing infrastructure;
    an industrial controller that controls the industrial automation device by a user-defined control program, hosted by the industrial controller, said user-defined control program receiving the cloud variables;
    a cloud agent that communicates with the user-defined control program and with the cloud-based application, said cloud agent collecting the cloud variables and sending the cloud variables to the cloud-based application,
    said cloud-based application determining updated optimized values of the cloud variables and notifying the cloud agent in the industrial controller with the updated optimized values of the cloud variables,
    said cloud agent reloading the updated optimized values of the cloud variables and notifying the user-defined control program with the updated optimized values of the cloud variables, and
    said user-defined control program including cloud constructs which request the updated optimized values of the cloud variables during runtime and reloading the updated optimized values of the cloud variables in the user-defined control program.

2. The system of claim 1, wherein the industrial controller is configured as a programmable logic controller.

3. The system of claim 1, wherein the user-defined control program is configured as a programmable logic controller-program.

4. The system of claim 1, wherein the cloud agent includes a unique identity number for identifying the user-defined control program for which the cloud variables are collected and on which the cloud variables are to be updated.

5. The system of claim 1, wherein the cloud agent is configured to aggregate continuously at least the cloud variables from the user-defined control program and to send the cloud variables to the cloud-based application.

6. The system of claim 1, wherein the industrial automation device is configured to generate non-cloud variables, said cloud agent being configured to collect the non-cloud variables.

7. An industrial controller configured to execute a data transfer, said industrial controller comprising,
    a user-defined control program hosted by the industrial controller, said user-defined control program controlling an industrial automation device and receiving cloud variables generated by the industrial automation device;
    a cloud agent that communicates with the user-defined control program and with a cloud-based application, said cloud agent collecting the cloud variables, sending the cloud variables to the cloud-based application, notifying the user-defined control program with updated optimized values of the cloud variables generated by the cloud-based application based on the received cloud variables, and reloading the updated optimized values of the cloud variables by the cloud agent,
    said cloud-based application determining the updated optimized values of the cloud variables and notifying the cloud agent in the industrial controller with the updated optimized values of the cloud variables, and
    said user-defined control program including cloud constructs which request the updated optimized values of the cloud variables during runtime and reloading the updated optimized values of the cloud variables in the user-defined control program.

8. A method for executing a closed loop control on data for a cloud-based application, said method comprising:
    generating cloud variables by an industrial automation device;
    hosting a cloud-based application by a network device with a cloud-computing infrastructure;
    controlling the industrial automation device by a user-defined control program which is hosted by an industrial controller;
    receiving the cloud variables by the user-defined program;
    collecting the cloud variables and sending the cloud variables to the cloud-based application with a cloud agent configured for communication with the user-defined control program and for communication with the cloud-based application;
    determining by the cloud-based application updated optimized values of the cloud variables and notifying the cloud agent in the industrial controller with the updated optimized values of the cloud variables;
    reloading the updated optimized values of the cloud variables by the cloud agent;
    notifying the user-defined control program with the updated optimized values of the cloud variables by the cloud agent; and
    providing cloud constructs by the user-defined control program which requests the updated optimized values of the cloud variables during runtime and reloading the updated optimized values of the cloud variables in the user-defined control program.

9. The method of claim 8, further comprising configuring the industrial automation device in a programming language, and defining the cloud variables in the programming language of the industrial automation device.

10. The method of claim 8, wherein the cloud agent sends the cloud variables to the cloud-based application using a wired link or a wireless radio link.

11. The method of claim 8, wherein the cloud agent includes a unique ID for identifying the user-defined control program for which the cloud variables are collected and on which the cloud variables are updated.

12. The method of claim 8, wherein the runtime is at the beginning of a scan cycle of the user-defined control program.

13. The method of claim 12, wherein the scan cycle of a user-defined control program comprises an input scan, an executing program, and an output scan.

\* \* \* \* \*